United States Patent Office 3,388,131
Patented June 11, 1968

3,388,131
METHOD OF PRODUCING ONIUM FLUORIDES SELECTED FROM THE GROUP CONSISTING OF NITROGEN, ANTIMONY, BORON AND ARSENIC
Gerd Urban, Erlangen, and Richard Dötzer, Nuremberg, Germany, assignors to Siemens Aktiengesellschaft, Munich, Germany, a corporation of Germany
No Drawing. Filed May 14, 1964, Ser. No. 367,578
Claims priority, application Germany, May 18, 1963, S 85,230
9 Claims. (Cl. 260—290)

My invention relates to a method of producing onium fluorides of the elements from the fifth group of the periodic system of elements, that is N, P, As, Sb and Bi. The term "onium fluoride" is understood to comprise the neutral and acidic fluorides of the ammonium-, phosphonium-, arsonium- and stibonium ion. The production of these compounds is useful, for example for producing electrolyte complex salts for the purification of elements in semiconductor chemistry. The metal-organic complex-salt melts, applicable for electro-refining of metals, can be formed, inter alia, from reaction between quaternary ammonium salts and organo-metal compounds according to the equation:

$$[(CH_3)_4N]Cl + Al(C_2H_5)_3 \rightarrow [(CH_3)_4N][(C_2H_5)_3AlCl]$$

It has been found advantageous to employ for these purposes quaternary ammonium salts in lieu of inorganic complex partners as electrolytes. Quaternary ammonium fluorides result in particularly stable electrolytes having good conductance properties and therefore are preferentially used as electrolytes. The fluorides, however, are not readily producible in the required completely solvate-free form because they form highly stable solvates in distinction from the other quaternary ammonium halogenides. The previously known production methods, operating in aqueous media, such as the conversion with silver oxide or silver salts, and ion exchange, result in salts containing water of crystallization which are dissociable only with great difficulties. Such salts are not suitable for the production of technologically appreciable quantities of solvate-free (dry) material.

It is an object of my invention, therefore, to devise a method which results in the production of pure solvate-free quaternary ammonium fluorides and onium fluorides of the other fifth-group elements in technological quantities.

This object is achieved according to my invention by reacting other halogenides of onium bases, preferably onium chlorides, with water-free hydrogen fluoride or its water-free solutions and with metal alkoxide. The sequence of hydrogen fluoride and metal alkoxide can be reversed. Thereafter the resulting alcohol solvate is thermally dissociated. The halogenide of the quaternary starting salt can be volatilized by an excess of hydrogen fluoride to hydrogen halide or can be eliminated as an insoluble compound, for example as a metal halogenide.

By virtue of the fact that my invention employs water-free solvents only, pure fluorides with acidic hydrogen absent can be obtained in very good yields. The absence of acidic hydrogen-containing constituents in the onium fluoride is absolutely necessary for its conversion with proton-sensitive metal alkyls to form electrolyte complex salts.

The following reaction equations, relating to the production of tetramethyl ammonium fluoride, illlustrate the above-mentioned two modes of performing the method of the invention:

MODE A

(1) $[(CH_3)_4N]Cl + 10HF \rightarrow$
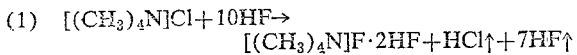
$[(CH_3)_4N]F \cdot 2HF + HCl\uparrow + 7HF\uparrow$ The chlorine ion is displaced by an excess of hydrogen fluoride and leaves the reaction as gaseous hydrogen chloride.

(2)
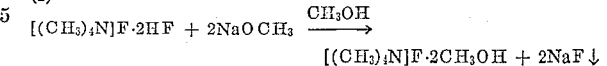
$[(CH_3)_4N]F \cdot 2HF + 2NaOCH_3 \xrightarrow{CH_3OH}$
$[(CH_3)_4N]F \cdot 2CH_3OH + 2NaF\downarrow$ The bound hydrogen fluoride is removed by neutralization with sodium alkoxide and precipitates as sodium fluoride.

(3)
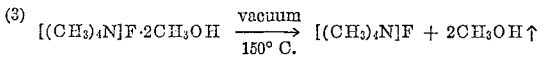
$[(CH_3)_4N]F \cdot 2CH_3OH \xrightarrow[150°\,C.]{vacuum} [(CH_3)_4N]F + 2CH_3OH\uparrow$ The solvent-free salt is obtained by thermal dissociation of the alcohol of crystallization.

MODE B

(4)
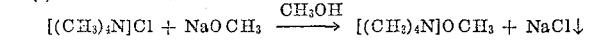
$[(CH_3)_4N]Cl + NaOCH_3 \xrightarrow{CH_3OH} [(CH_3)_4N]OCH_3 + NaCl\downarrow$ The chlorine ion is precipitated by sodium alkoxide.

(5)
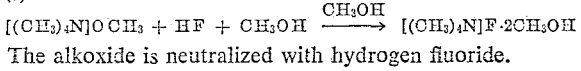
$[(CH_3)_4N]OCH_3 + HF + CH_3OH \xrightarrow{CH_3OH} [(CH_3)_4N]F \cdot 2CH_3OH$ The alkoxide is neutralized with hydrogen fluoride.

(6)
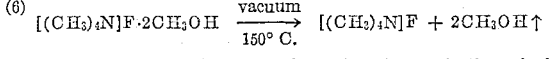
$[(CH_3)_4N]F \cdot 2CH_3OH \xrightarrow[150°\,C.]{vacuum} [(CH_3)_4N]F + 2CH_3OH\uparrow$ The solvate-free salt is obtained by thermal dissociation of the alcohol of crystallization.

The above-mentioned modes of production are not limited to the particular example described, but are suitable for the production of other onium fluorides of the elements in the fifth group of the periodic system. The method comprises also the reactions of known primary, secondary and tertiary onium ions of nitrogen and phosphorus with the corresponding fluorides. Suitable as water-free solvents for HF are lower aliphatic ethers, for example dimethyl ether, diethyl ether, or diiso propyl ether as well as lower aliphatic alcohols, for example methanol, ethanol or isopropanol.

The method of my invention may also be interrupted after some of the reaction steps, and in this manner certain intermediates can be obtained. Thus, after conversion with hydrogn fluoride, dihydrogen fluoride or trihydrogen fluoride, for example, can be obtained from the resulting reaction solution of hydrogen fluoride solvate of the onium fluoride, by concentrating the solution, which contains an excess of hydrogen fluoride, by application of heat and/or reduced pressure. The excess of hydrogen fluoride can also be reduced by extraction with lower aliphatic ethers, for example diethyl ether or diiso propyl ether. Mono- or dihydrogen fluorides of onium fluorides can likewise be produced by partial neutralization, namely by adding the calculated quantity of metal alkoxide to the acidic onium fluoride. The preferred metal alkoxide is sodium alkoxide. However, alkoxides of lithium, potassium, calcium, magnesium, and aluminum, are also applicable. The alcohols for the alkoxide compounds are lower aliphatic alcohols, and preferably methanol and propanol. The solvates in this case are stoichiometrically composed addition compounds of onium fluorides with solvent molecules, regardless of the particular bonding forces or structures. Alcohol solvates of the onium fluoride occurring as intermediate products in the method according to the invention can also be isolated.

The method of the invention is further described with repsect to specific examples which are not intended to limit the scope thereof.

Example 1 $[(CH_3)_4N]F$ 1.0 kg. (50 moles) of hydrogen fluoride was introduced into a 2-liter flask of polyethylene under exclusion of humidity from a pressure bottle. 548 g. (5.0 moles) of dry tetramethylammonium chloride were supplied to the flask in portions. The displaced hydrogen chloride escaped rapidly since the flask was not cooled. Thereafter, the polyethylene flask was gradually heated with reflux to keep the contents boiling until the escaping hydrogen fluoride was free of chlorine. The solution was transferred to a polytetrafluorethylene (Teflon) flask. Dry air was then passed through the flask, which was kept in a heating bath whose temperature was gradually heated from 100 to 150° C. The heating continued until sufficient hydrogen fluoride distilled off so that the flask content amounted to only 665 g. This quantity corresponds to the presence of the quaternary dihydrogen trifluoride.

The melt thus obtained was dissolved in 1 liter of absolute methanol. The solution was poured into a 4-liter flask containing a sodium methoxide solution prepared from 230 g. (10.0 moles) sodium and 2 liters methanol. The precipitated NaF was centrifuged off and washed two to three times. The combined solutions were concentrated by distilling off the methanol. Subsequently, the last of the methanol was eliminated at bath temperature of 40° C. and a pressure of 1 torr until the compound $$[(CH_3)_4N]F \cdot 2CH_3OH$$

precipitated in crystalline form. By heating from 75 up to 100° C., the compound $[(CH_3)_4N]F \cdot CH_3OH$ resulted. This was subsequently dissociated to the solvate-free fluoride by additional heating so that the oil-bath temperature was 150° C. The process was promoted by frequent shaking and comminuting the salt mass.

Example 2 $[(CH_3)_4N]F$ 548 g. (5.0 moles) dry tetramethylammonium chloride were dissolved in 1.0 liter absolute methanol with exclusion of atmospheric humidity, and were added to a methoxide solution prepared from 115 g. (5.0 moles) sodium and about 1 liter $CH_3OH$. The resulting precipitation of finely distributed NaCl was permitted to settle. The clear solution was first decanted from the bottom body by syphoning and subsequently by centrifuging. The methanol was distilled out of the solution with the aid of an oil-pump vacuum to the extent required to reduce the ratio of methanol to base from the original value of 8.5 down to 4. Continued concentration and cooling were applied for again precipitating NaCl which was ultimately filtered off by means of a glass filter. The quaternary methoxide solvate, in form of large crystals, already crystallized from the remaining concentrated solution.

The base was neutralized by introducing equivalent quantities of hydrogen fluoride (about 86 g.). The dissolved sodium then precipitated almost completely as NaF and was filtered off. The fluoride solution was then further processed to solvate-free fluoride as in Example 1.

Example 3 $[C_7H_7NC_5H_5]F$ 41 g. (0.2 mole) dry 1-benzylpyridinium chloride were added to 40 g. (2 moles) of hydrogen fluoride in a 100-ml. polyethylene flask. By heating up to 100° C., hydrogen chloride and excessive hydrogen fluoride were distilled off until the flask content amounted to 54 g. By multiple ethering out, an additional amount of about 6 g. HF were removed so that now, for example, $$[C_7H_7NC_5H_5]F \cdot 2.3HF$$

remained. The product was liquid. It neutralized with the calculated quantity of sodium methoxide. Methanol was distilled out of the red-brown solution while maintaining room temperature at the oil pump, and 29 g. tar-colored 1-benzylpyridinium fluoride was obtained.

Example 4 $[(CH_3)_4Sb]F$ 40 g. (2 moles) of hydrogen fluoride were condensed from a pressure bottle in a 200-ml. polyethylene bottle. Portions amounting to 15.5 g. (50 mmoles) tetramethylstibonium iodide were then added at room temperature under exclusion of air. The displaced hydrogen iodide rapidly escaped from the reaction vessel which was not subjected to cooling. Thereafter, the flask was heated in a bath up to 100° C., and hydrogen fluoride vaporized out of the solution until the flask content weighs only 15 g., which in this case corresponds to the composition $[(CH_3)_4Sb]F \cdot 5HF$. The resulting colorless liquid is ethered out, and tetramethylstibonium-dihydrogentrifluoride was segregated as a colorless, fine-crystalline and strongly hygroscopic product.

9.8 g. (41 mmoles) of this powder were neutralized with sodium methoxide solution. After separating the precipitating sodium fluoride from this solution, methanol was removed at room temperature, first by the vacuum produced by a water-jet pump and subsequently by the vacuum produced by an oil pump. After crystallization, the weight corresponded to the composition $$[(CH_3)_4Sb]F \cdot 1.3 \; CH_3OH$$

After constancy of weight was obtained, there remained 6.4 g. of tetramethylstiboniumfluoride, which hardly exhibits any fluidity.

The production of stiboniumfluoride compound also shows that the analogous phosphoniumfluoride and arsoniumfluoride compounds can be prepared by my invention because the tendency of formation for quaternary onium ions decreases in the sequence $R_4N^+$, $R_4P^+$, $R_4As^+$, $R_4Sb^+$.

Example $[(CH_3)_3NC_7H_7]F$ 470 g. (23 moles) hydrogen fluoride were reacted with 400 g. (2.16 moles) of dry trimethyl benzylammonium-chloride according to Example 1. The resulting hydrogen chloride vaporized. Thereafter, hydrogen fluoride was distilled off until the reaction solution was reduced to a weight of 470 g. This weight corresponds to the presence of $[(CH_3)_3NC_7H_7]F \cdot 2.5HF$. The liquid product was poured into a sodium propoxide solution freshly prepared from 118 g. (5.13 moles) sodium and 2.46 kg. (41 moles) absolute n-propanol, and was then shaken and/or stirred. Sodium fluoride precipitated in finely divided form. After centrifuging off the NaF, the solution was first concentrated by a water-jet pump vacuum to distill off the propanol, and was thereafter reduced to the solvate-free fluoride by oil pump vacuum at a heating-bath temperature of 100° C.

Example 6 $[(C_2H_5)_4N]F \cdot 2HF)$ 820 g. (41 moles) of hydrogen fluoride were reacted with 660 g. (3.1 moles) of tetraethylammonium bromide according to Example 1. At increasing temperature, the solution was concentrated until the weight of the reaction liquid was only 656 g. This weight corresponds to the presence of the quaternary trihydrogentetrafluoride. By ethering out, a precipitation of 259 g. (2.8 moles) tetraethylammoniumhydrogentrifluoride $[(C_2H_5)_4N]F \cdot 2HF$ is obtained, the product being colorless, fine-crystalline and strongly hygroscopic.

Example 7 $[(CH_3)_3NC_2H_5]F \cdot 2HF$ 123 g. (1 mole) of trimethylethylammonium chloride were reacted with 200 g. hydrogen fluoride according to Example 1. By vaporizing and ethering according to Example 3, liquid trimethylethylammonium hydrogen trifluoride was obtained. This product was liquid and crystallized out when cooled to low temperature.

Example 8 $[(C_3H_7)_4N]F \cdot 2HF$ 63 g. (0.2 mole) of tetra-n-propylammoniumiodide were reacted with 40 g. (2 moles) hydrogen fluoride according to Example 4. By vaporizing and ethering with the aid of dipropyl ether, colorless and fine crystalline tetrapropylammonium hydrogen trifluoride was obtained.

Example 9 [(CH$_3$)$_3$NC$_{16}$H$_{33}$]F·3HF 80 g. (4 moles) of hydrogen fluoride were reacted with 64 g. (0.17 mole) of trimethylcetylammonium bromide according to Example 1, by vaporizing and ethering with dipropyl ether, to yield flocculent trimethylcetylammonium hydrogen tetrafluoride.

Example 10 [C$_{16}$H$_{33}$NC$_5$H$_5$]F·2HF

According to Example 9, 68 g. (0.2 mole) of cetylpyridiniumchloride were reacted with hydrogen fluoride. By vaporizing and adding propyl ether and ligroin, cetylpyridinium hydrogen trifluoride was produced.

Example 11 [(CH$_3$)$_3$NC$_6$H$_5$]F 86 g. (0.5 mole) of trimethylphenylammonium chloride were reacted with hydrogen fluoride according to Example 1. By vaporization, an amount of 99 g.

$$[(CH_3)_3C_6H_5N]F \cdot 2.4HF$$

was obtained. By neutralizing with sodium methoxide and drying, trimethylphenyl ammonium fluoride was isolated with a molecule of methanol of solvation.

Example 12 [(C$_6$H$_5$)$_4$P]F 75 g. (0.2 mole) tetraphenyl phosphonium chloride were reacted with hydrogen fluoride according to Example 1. By vaporizing and ethering, crystalline $$[(C_6H_5)_4P]F \cdot 3HF$$

was obtained. Neutralizing according to Example 1 and drying at 90° C. resulted in colorless tetraphenyl phosphonium fluoride.

Example 13 [(C$_6$H$_5$)$_4$As]F 42 g. (0.1 mole) tetraphenyl arsonium chloride were reacted with hydrogen fluoride according to Example 1. By vaporizing, solid [(C$_6$H$_5$)$_4$As]F·3HF was obtained. This compound can be converted by ethering to fine-crystalline [(C$_6$H$_5$)$_4$As]F·2HF. Neutralizing and drying at 50° C. resulted in fine-crystalline tetraphenyl arsonium fluoride.

Example 14 [(CH$_3$)As(C$_6$H$_5$)$_3$]F 90 g. (0.2 mole) methyltriphenyl arsonium iodide were reacted with hydrogen fluoride according to Example 4. By vaporizing and ethering, [CH$_3$As(C$_6$H$_5$)$_3$]F·2.3HF was isolated. This product solidified at room temperature. Neutralizing and drying at 90° C. yielded the colorless, fine-crystalline and slightly delignescent, methyltriphenyl arsonium fluoride.

Example 15

67 g. (1 mole) methyl ammonium chloride were reacted with hydrogen fluoride according to Example 1. By vaporizing and ethering, liquid [CH$_3$NH$_3$]F·HF was obtained, which can be neutralized with methyl amine solution to form crystalline and strongly hygroscopic methyl ammonium fluoride.

Example 16

Crystalline and somewhat delignescent dimethyl ammonium fluoride was obtained from 81 g. (1 mole) dimethyl ammonium chloride according to Example 15.

The neutral onium fluorides produced by the method according to the invention afford the production of fluoralkyls and fluoraryls by an advantageous process involving simple thermal dissociation. The latter compounds are of value for organic preparatory or preservative purposes and, in part, are also needed for the production of electrolyte salts. The performance of such a dissociation of onium fluorides in practice will be described with reference to the following examples.

Example 17

151 g. (0.89 mole) of trimethylbenzyl ammonium fluoride, produced according to Example 4, were dissociated with the aid of an oil bath heated up to 200° C. The vaporous dissociation products were exhausted, first through an ice cooler, and thereafter through a water bottle containing hydrochloric acid. The raw benzyl fluoride was combined with the ether extract of the acidic amine salt solution; the ether solution was washed with hydrochloric acid, treated with NaHCO$_3$ solution, and dried with Na$_2$SO$_4$. At a water-jet pump vacuum, the ether was largely drawn off at room temperature. The residue was subjected to fractional distillation.

Example 18

By applying the method described in Example 17, tetramethyl ammonium fluoride was thermally dissociated to produce and isolate methyl fluoride.

By virtue of a good conductance, the salt-like onium fluorides produced according to the invention can also be employed in dissolved or molten condition as a dielectric filling of electrolyte capacitors or similar electric purposes, as well as for the anodic deposition of fluoride coatings on metal surfaces. The acidic onium fluorides are also applicable as etching agents.

We claim:

1. The method of producing onium fluorides of an element selected from the group consisting of nitrogen, phosphorus, arsenic and antimony, which comprises reacting onium-base halogenides with water-free hydrogen fluoride and with metal alkoxide, and thermally dissociating the resulting alcohol solvate to the onium fluoride.

2. The method of producing onium fluorides of an element selected from the group consisting of nitrogen, phosphorus, arsenic and antimony, which comprises reacting onium-base halogenides with a water-free solution of hydrogen fluoride and with metal alkoxide, and thermally dissociating the resulting alcohol solvate to the onium fluoride.

3. The method of producing onium fluorides of an element selected from the group consisting of nitrogen, phosphorus, arsenic and antimony, which comprises reacting onium chloride with metal alkoxide and with a substance selected from the group consisting of water-free hydrogen fluoride and water-free solutions thereof, and thermally dissociating the resulting alcohol solvate to the onium fluoride.

4. The method of producing onium fluorides of an element selected from the group consisting of nitrogen, phosphorus, arsenic and antimony, which comprises reacting onium-base halogenides with metal alkoxide and with a water-free solution of hydrogen fluoride in organic solvent selected from the group consisting of aliphatic ethers and aliphatic alcohols, and thermally dissociating the resulting alcohol solvate to the onium fluoride.

5. The method of producing onium fluorides according to claim 4, wherein said solvent is selected from the group consisting of dimethyl ether, diethyl ether, diiso propyl ether, methanol, ethanol and isopropanol.

6. The method of producing onium fluorides of an element selected from the group consisting of nitrogen, phosphorus, arsenic and antimony, which comprises reacting onium-base halogenides with water-free HF and metal alkoxide, and concentrating the reaction product in an excess of HF to yield the trihydrogen fluoride.

7. The method of producing onium fluoride of an element selected from the group consisting of nitrogen, phosphorus, arsenic and antimony, which comprises reacting onium-base halogenides with water-free HF and metal alkoxide, concentrating the reaction product in an excess of HF to yield the trihydrogen fluoride, and thereafter removing the excess hydrogen fluoride by extraction with a lower aliphatic ether to the dihydrogen fluoride.

8. The method of producing onium fluorides of an element selected from the group consisting of nitrogen, phosphorus, arsenic and antimony, which comprises reacting onium-base halogenides with water-free hydrogen fluoride and with sodium alkoxide, and thermally dissociating the resulting alcohol solvate to the onium fluoride.

9. The method of producing onium fluorides of an element selected from the group consisting of nitrogen, phosphorus, arsensic and antimony, which comprises reacting onium-base halogenides with water-free hydrogen fluoride and with lower sodium alkoxide, and thermally dissociating the resulting alcohol solvate to the onium fluoride.

References Cited
UNITED STATES PATENTS

| | | | |
|---|---|---|---|
| 2,694,715 | 11/1954 | Stayner | 260—290 |
| 2,826,582 | 5/1958 | Miller | 260—290 |
| 2,909,525 | 10/1959 | Fand | 260—290 |
| 3,178,435 | 4/1965 | Muttinz | 260—290 |
| 2,644,005 | 2/1949 | Urbschat | 260—440 |
| 2,946,814 | 7/1960 | Peri | 260—440 |
| 2,221,831 | 4/1939 | Brown et al. | 260—446 |
| 2,993,924 | 7/1961 | Marka et al. | 260—446 |
| 2,933,529 | 4/1960 | Hwa | 260—567.6 |
| 2,941,004 | 6/1960 | Pinson et al. | 260—567.6 |
| 3,010,998 | 11/1961 | Garner | 260—606.5 |
| 3,145,234 | 8/1964 | Buckler et al. | 260—606.5 |
| 2,698,338 | 12/1954 | Heider | 260—465.9 |

FOREIGN PATENTS
673,338 10/1963 Canada.

OTHER REFERENCES
Chemical Abstracts, vol. 42, par. 6211–F (1948).
Chemical Abstracts, vol. 48, par. 6214–e (1954).
Chemical Abstracts, vol. 50, par. 16281–g (1956).
Chemical Abstracts, vol. 50, par. 397–e (1956).
Chemical Abstracts, vol. 48, par. 7993 (1954).
Chemical Abstracts, vol. 58, par. 9610–c (May 13, 1963).
Chemical Abstracts, vol. 34, par. 7870 (1934).
Chemical Abstracts, vol. 16 par. 1740 (1922).
Chemical Abstracts, vol. 30, par. 1059 (1936).
Chemical Abstracts, vol. 16, p. 2516 (1922).
Fieser et al.: Advanced Organic Chemistry, Reinhold (1961), p. 493.
Chemical Abstracts, vol. 19, p. 1913 (1925).
Chemical Abstracts, vol. 49, par. 7511 (1955).

JOHN D. RANDOLPH, *Primary Examiner.*

WALTER A. MODANCE, N. S. MILESTONE, *Examiners.*

A. L. ROTMAN, *Assistant Examiner.*